United States Patent [19]

Felcht et al.

[11] Patent Number: 4,474,950

[45] Date of Patent: Oct. 2, 1984

[54] CELLULOSE ETHERS HAVING IMPROVED DISPERSING PROPERTIES

[75] Inventors: Utz-Hellmuth Felcht, Bad Soden-Neuenhain; Helmut Berenbold, Wiesbaden, both of Fed. Rep. of Germany

[73] Assignee: Hoechst Aktiengesellschaft, Frankfurt am Main, Fed. Rep. of Germany

[21] Appl. No.: 527,161

[22] Filed: Aug. 26, 1983

[30] Foreign Application Priority Data

Sep. 1, 1982 [DE] Fed. Rep. of Germany ....... 3232467

[51] Int. Cl.$^3$ ...................... C08B 15/05; C08B 15/06; C08B 11/20
[52] U.S. Cl. ........................................ 536/85; 536/43; 536/44; 536/87; 536/91
[58] Field of Search ...................... 536/43, 44, 84, 85, 536/87, 88, 91

[56] References Cited

U.S. PATENT DOCUMENTS

| | | | |
|---|---|---|---|
| 2,532,622 | 12/1950 | Hunter | 536/87 |
| 2,562,955 | 8/1951 | Schuyten | 536/56 |
| 2,879,268 | 3/1959 | Jullander | 536/87 |
| 3,297,583 | 1/1967 | Dierichs | 252/363.5 |
| 3,418,312 | 12/1968 | Klebe | 536/56 |
| 3,961,976 | 6/1976 | Karlsson | 106/186 |
| 3,997,508 | 12/1976 | Ziche | 536/87 |
| 4,097,667 | 6/1978 | Holst | 536/87 |
| 4,106,948 | 8/1978 | Cooper et al. | 106/197 R |

FOREIGN PATENT DOCUMENTS

| | | |
|---|---|---|
| 528160 | 7/1956 | Canada .................................. 536/84 |
| 0038107 | 10/1981 | European Pat. Off. . |
| 0041364 | 12/1981 | European Pat. Off. . |
| 0055820 | 7/1982 | European Pat. Off. . |
| 842044 | 6/1952 | Fed. Rep. of Germany . |
| 1273810 | 7/1968 | Fed. Rep. of Germany . |
| 1518213 | 5/1969 | Fed. Rep. of Germany . |
| 1668854 | 6/1971 | Fed. Rep. of Germany . |
| 1668129 | 7/1971 | Fed. Rep. of Germany . |
| 2535311 | 2/1976 | Fed. Rep. of Germany . |
| 2521946 | 11/1977 | Fed. Rep. of Germany . |
| 2725764 | 12/1977 | Fed. Rep. of Germany . |
| 2415556 | 10/1978 | Fed. Rep. of Germany . |
| 2556754 | 6/1981 | Fed. Rep. of Germany . |
| 3104530 | 12/1981 | Fed. Rep. of Germany . |
| 3104531 | 12/1981 | Fed. Rep. of Germany . |
| 1224390 | 3/1971 | United Kingdom . |
| 1465934 | 3/1977 | United Kingdom . |
| 2070613 | 9/1981 | United Kingdom . |
| 2070612 | 9/1981 | United Kingdom . |

*Primary Examiner*—Ronald W. Griffin
*Attorney, Agent, or Firm*—Berman, Aisenberg & Platt

[57] ABSTRACT

Modified cellulose reaction products, which are dispersible in aqueous media over a broad pH range without lump formation, are prepared by reacting water-soluble cellulose ether with a specified silane modifying agent in the amount of from 0.0001 to 0.12 mole of modifying agent per mole of cellulose in the cellulose ether.

25 Claims, No Drawings

CELLULOSE ETHERS HAVING IMPROVED DISPERSING PROPERTIES

TECHNICAL FIELD

The present invention relates to cellulose ethers which can be dispersed in aqueous media and to a process for preparing them by reacting water-soluble cellulose ethers with a modifying agent.

BACKGROUND

Water-soluble cellulose ethers, such as sodium carboxymethylcellulose (NaCMC), methyl-hydroxyethylcellulose (MHEC), methyl-hydroxypropylcellulose (MHPC), ethyl-hydroxyethylcellulose (EHEC), hydroxyethylcellulose (HEC) or hydroxypropylcellulose (HPC) are widely used as viscosity-producing substances (for example, as thickeners, adhesives, binders or dispersing auxiliaries). It is, however, often indispensable to add them to water or aqueous systems, whereby difficulties are liable to occur with respect to dispersing or dissolving these cellulose ethers (without forming lumps) and thus achieving rapid and uniform dissolution until the final desired degree of viscosity is reached. Various methods have been proposed by prior art publications which, in principle, suggest preventing or retarding initial swelling of surfaces of cellulose ether particles (powders, granulates, agglomerates) due to the action of water molecules at least until the particles are uniformly distributed in a water-containing medium.

Cellulose ethers have been treated with dialdehydes, such as glyoxal, during or after a manufacturing process in order to cause reversible cross-linking of the cellulose ether molecules (see, for example, U.S. Pat. No. 2,879,268; German Auslegeschrift No. 12 73 810 (equivalent to U.S. Pat. No. 3,297,583); German Offenlegungsschrift No. 15 18 213 or German Auslegeschrift No. 24 15 556 (equivalent to U.S. Pat. No. 3,997,508). This type of cross-linking has, however, the disadvantage that it is only effective, i.e., makes possible a lump-free addition, in those cases where the cross-linked cellulose ethers are used in aqueous media having pH values close to the neutral point. For this reason, the thus cross-linked cellulose ethers can only be used to a very limited extent in those fields of application where the pH values of the aqueous media are in the highly acidic or highly basic range. In particular in the highly basic range, the cross-linkage, which in general is a semiacetal bond, is rapidly cleaved, so that, as a consequence of this reversible cleavage of the cross-linking, lumps form due to the too rapid interaction between the particle surfaces and the water molecules.

A reversible cross-linking can also be obtained by reacting cellulose ethers with $Al^{3+}$ ions [see, for example, German Offenlegungsschrift No. 16 68 854 (equivalent to British Pat. No. 1,224,390) or European Offenlegungsschrift No. 0 038 107], this type of cross-linking being naturally restricted to cellulose ethers with anionic groups, such as NaCMC.

In accordance with German Pat. No. 25 56 754 (equivalent to U.S. Pat. No. 4,097,667), cellulose ethers which carry hydroxyalkyl groups are reacted with chloroformic acid esters, about 0.2 to 0.6 mole of chloroformic acid ester being used per mole of cellulose ether. Hydroxyalkylcelluloses which have been modified in this way can be dissolved by adjusting the pH of the aqueous medium to at least 12 after their addition (as a dispersion). The reaction itself must also be performed in the presence of a base. It is for this reason that the process is less suitable for the treatment of ready-made cellulose ethers, because a relatively high amount of the modifying agent is required. Moreover, the application of a pH of 12 and higher is not without difficulties in the case of certain aqueous systems.

It is said that cellulose ethers modified with boric acid or borates can be added to aqueous media having a pH of more than 10 without agglomeration of the cellulose ethers occurring. According to German Offenlegungsschrift No. 25 35 311 (equivalent to British Pat. No. 1,465,934), it is also possible, if appropriate, to treat cellulose ethers, which are already cross-linked with glyoxal, with borate ions, this modification taking place in a slurry of the cellulose ether in an organic solvent, such as acetone. The maximum amount of added borate ions is about 5 percent. This process is, however, not very well-suited for practical purposes, since relatively high amounts of organic solvent are required, and such solvent has to be removed again from the slurry. Moreover, these modified cellulose ethers cannot be dispersed or at least can be dispersed less readily at a pH of less than 10 than is the case at a pH of more than 10. European Offenlegungsschriften Nos. 0 041 364 and 0 055 820, too, describe the use of borate ions for modifying the solubility characteristics of NaCMC or HEC, but in these cases the borate ions are already employed during alkali cellulose production. Nothing is stated about a possible improved dispersibility at certain pH values.

Cellulose and cellulose derivatives have also been reacted with inorganic or organic silicon compounds: in accordance with German Pat. No. 842 044 (equivalent to U.S. Pat. No. 2,532,622), cellulose esters or cellulose ethers having a DS (degree of substitution) of from 1 to 2.75 are reacted with triaryl- or diarylmonoalkylsilyl halides in the presence of a hydrogen halide acceptor, such as pyridine or ammonia; the products obtained carry the organic silyl groups as ether substituents, and they are said to possess a greater thermal stability and increased hydrophobicity and to be suitable for the production of films; an analysis of the degree of substitution of a cellulose mixed ether based on MC gave a $DS_M$ of 1.7 and a $DS_{Si}$ of 1.3;

in accordance with U.S. Pat. No. 2,562,955 cellulose, cellulose esters or cellulose ethers are reacted with mono-, di- or trialkylsilyl chlorides or -silyl acetates in the presence of an acid-binding agent, such as pyridine; the products obtained carry the organic silyl groups as ether substituents, and they are said to be insoluble in the solvents and solvent mixtures conventionally used in the field of cellulose ether chemistry; the only cellulose mixed ether based on MC which is described exactly has a $DS_M$ of 1.8 and a $DS_{Si}$ of 0.24, the products are said to be more hydrophobic and insoluble in organic solvents;

in accordance with German Offenlegungsschrift No. 16 68 129 (equivalent to U.S. Pat. No. 3,418,312) cellulose ethers with trimethylsilyl groups of a DS of between 2 and 3 are prepared by reacting trimethylsilyl chloride, a mono- or disaccharide, an organic solvent, a tertiary amine and cellulose with each other; the products obtained are said to be soluble in organic solvents, such as chloroform or benzene;

in accordance with German Auslegeschrift No. 25 21 946 (equivalent to U.S. Pat. No. 3,961,976) alkali metal cellulose, sodium metasilicate and sodium monochloroacetate are reacted with one another in the presence of $H_2O_2$ and $Fe^{2+}$ ions, whereby a silicon-modified NaCMC of an undefined chemical structure, which is said to be readily soluble in water, is formed;

in accordance with German Offenlegungsschrift No. 27 25 764 (equivalent to U.S. Pat. No. 4,106,948) an aqueous composition for surface coatings having improved resistance to water is prepared from water, HEC and an organic silicon compound of the general formula $R^1Si(OR^2)_3$, wherein $R^1$ is a methyl, ethyl or vinyl group and $R^2$ is a methyl, ethyl or methoxyethyl group; in particular, this silicon compound is methyl trimethoxysilane; in the mixture, 1 to 30 parts by weight of the organic silicon compound are contained per part by weight of HEC; at a pH between 3 and 5.5 the compositions are clear solutions;

and in accordance with German Offenlegungsschriften No. 31 04 530 (equivalent to British Patent Application No. 2,070,613) and No. 31 04 531 (equivalent to British Patent Application No. 2,070,612) trimethylsilyl celluloses are prepared either in an organic solvent in the presence of $Na_2CO_3$ or in liquid ammonia, whereby the degree of substitution obtained in general varies between 1.3 and 2.7; the products are insoluble in water, but may be soluble in certain solvents, such as hydrocarbons or ethers.

However, these known processes still have certain disadvantges, which in most cases are due to the fact that the reacted quantity of silane is very high, and therefore, the cellulose mixed ethers obtained in general are not or are not completely soluble even after prolonged treatment at the most diverse pH values. Moreover, the process conditions of reactions in anhydrous organic solvents, such as pyridine or toluene or liquid ammonia are not suitable for large-scale industrial production of cellulose ethers, since they are much too expensive for the production of bulk products. It is true that reactions of silanes possessing only one group which is able to react with cellulose ethers (such as trimethylsilyl chloride) result, via a monofunctional substitution at the OH groups, in the formation of mixed ethers, but it is not possible to achieve a bi- or trifunctional substitution reaction between molecules (i.e., cross-linking) using this type of silane.

SUMMARY OF THE INVENTION

The primary object of the present invention is to provide a commercially feasible process for the preparation of modified cellulose ethers which can be worked into aqueous media of a broad pH range (from strongly acidic to strongly alkaline) without lump formation, the viscosity build-up of which can be precisely adjusted and controlled by simple technical means during and after the working-in phase where they are dispersed, and which (even by addition of small amounts of an appropriate modifying agent) can be converted into reversible types of modification. A further object is for the proposed process to be one capable of being integrated into known plants and process stages of cellulose ether production without much operative and process-engineering expense. A still further object is the resulting modified cellulose ethers, which are (cellulose ether)/silane reaction products.

These objects are achieved by providing a process for the preparation of cellulose ethers (which can be dispersed in aqueous media) by reacting water-soluble cellulose ethers with a modifying agent. The process of the invention is characterized by the modifying agents, which are silanes, $R^4$—R, and R is of the formula:

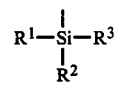

wherein $R^1$ denotes an alkyl radical, an alkenyl radical or an optionally-substituted aryl radical; $R^2$ and $R^3$ denote hydrogen or an alkyl radical, an alkenyl radical, an optionally-substituted aryl radical, an optionally-substituted alkoxy radical, an optionally-substituted aryloxy radical, an acyloxy radical, an O-silyl (O—R) radical or an N-silyl (NH—R) radical and are identical or different; and $R^4$ denotes an optionally-substituted alkoxy radical, an optionally-substituted aryloxy radical, an acyloxy radical, an O-silyl (O—R) radical or an N-silyl (NH—R) radical; the amount of modifying agent varying between 0.0001 and 0.12 mole per mole of cellulose.

If one of the recited substituted radicals contains an alkyl or alkenyl substituent, it comprises from 1 to 4 carbon atoms; an aryl substituent will, in particular, comprise up to 15 carbon atoms. 1 mole of cellulose has the molecular mass of one anhydro-D-glucose unit in g. The term "substituted" is meant to include a chlorine, bromine, alkoxy, aryloxy or phenyl substituent in the case of an aryl radical, and an alkoxy or aryloxy substituent in the case of an alkoxy or aryloxy radical.

Each alkyl radical is lower alkyl having, e.g., from 1 to 4 carbon atoms, such as methyl, ethyl, propyl, isopropyl, butyl, isobutyl, secondary butyl and tertiary butyl. Each alkenyl radical is lower alkenyl having, e.g., from 2 to 4 carbon atoms and is, similarly, straight chain or branched; examples are vinyl, allyl and 1,3-butadienyl.

Each aryl is phenyl, α-naphthyl, β-naphthyl or any of these ring substituted by one or more lower aliphatic hydrocarbyl groups, e.g., 2,4,6-triethylphenyl, p-vinylphenyl and 2,3,6,7-tetramethylnaphthyl(1). The lower aliphatic hydrocarbyl groups are alkyl or alkenyl as previously defined. Each aryl (including aliphatic side groups) has a maximum of 15 carbon atoms. The number and placement of such side groups is not otherwise limited except, possibly, by steric hindrance.

The alkyl of each alkoxy radical has the same meaning, the same limitations and the same exemplification as each alkyl radical (as previously defined).

The aryl of each aryloxy radical has the same meaning, the same limitations and the same exemplification as each aryl radical (as previously defined).

Each acyloxy radical is one derived from an aliphatic or an aromatic carboxylic acid. The aliphatic carboxylic acids are alkanoic acids having up to 4 carbon atoms, e.g. acetic acid, propionic acid and butyric acid. The aryl of each aromatic carboxylic acid has the same meaning, the same limitations and the same exemplification as each aryl (as previously defined). Acyloxy thus includes groups having from 2 to 16 carbon atoms. Each alkanoyloxy has up to 4 carbon atoms unless otherwise limited.

Silanes $R^4$—R are known. They are conventionally prepared from available starting materials. Their use in modifying cellulose ethers so that the latter may be dispersed in aqueous media over a broad pH range without lump formation is the substance to which this disclosure is directed. In that regard the range of molar amounts of $R^4$—R per mole of cellulose in the resulting modified cellulose ethers is significant.

In preferred embodiments of the process of the invention, $R^1$ denotes an alkyl radical in the general formula of the silane, and $R^3=R^4$ and denotes an optionally-substituted alkoxy or alkanoyloxy radical; and in particular, in the general formula of the silane, $R^1$ denotes an alkyl radical ($C_1$ or $C_2$) and $R^2=R^3=R^4$ denotes an alkanoyloxy radical ($C_1$ or $C_2$) or an alkoxy radical ($C_1$ or $C_2$) optionally-substituted by an alkoxy group ($C_1$ or $C_2$). The silanes are preferably used in amounts between 0.0005 and 0.10 mole per mole of cellulose. Examples of suitable silanes are:

ethyl-triacetoxysilane
($R^1=C_2H_5$, $R^2=R^3=R^4=O$—CO—$CH_3$)
methyl-tri(2-methoxy-ethoxy-)silane
($R^1=CH_3$, $R^2=R^3=R^4=O$—$C_2H_4$—O—$CH_3$)
methyl-trimethoxysilane
($R^1=CH_3$, $R^2=R^3=R^4=O$—$CH_3$)
methyl-triethoxysilane
($R^1=CH_3$, $R^2=R^3=R^4=O$—$C_2H_5$)
hexamethyl-disilazane
[$R^1=R^2=R^3=CH_3$, $R^4=NH$—$Si(CH_3)_3$]

It is also possible to employ different types of siloxane, for example, one type in which $R^1$ denotes $CH_3$, $R^2=R^3$ and denotes O—$C_2H_5$ and $R^4$ denotes (O—$Si(CH_3)(O$—$C_2H_5))_n$—O—$C_2H_5$ or another type, in which $R^1=R^2=R^3$ and denots $CH_3$ and $R^4$ denotes [O—$SiO(CH_3)]_m$—[O—$Si(CH_3)_2]_e$—$Si(CH_3)_3$ (n and m are about 2; e is about 30). Those silanes which do not have just one, but have at least two groups which can be split off in the substituents $R^2$ and $R^4$ are preferably employed, since they are capable of undergoing true cross-linking reactions; one of the advantages presented by them is that already very small amounts of silanes are sufficient to achieve an effective modification. The silanes are usually colorless to slightly yellow liquids which are soluble in the conventional organic solvents; some of them are also soluble in water, although in many cases, hydrolysis is likely to occur when they are added to water; the polymeric types may also exhibit a more or less pronounced viscosity. Silanes of the most diverse degrees of substitution are known from literature and are commercially available.

In the practical preparation of cellulose ethers the process of the invention is applied such that already dry or still moist cellulose ethers are reacted with the silane, preferably in the presence of an organic water-soluble solvent, such as isopropanol or acetone, and in the presence of water, in a conventional mixer (for example, a stirred kettle, kneader or impeller mixer). The presence of water and/or an organic solvent is not compulsory, however. Suitable water-soluble cellulose ethers include, for example, the types mentioned at the outset, in particular hydroxyalkylcelluloses or alkyl-hydroxyalkylcelluloses with an alkyl radical of $C_1$ or $C_2$ and a hydroxyalkyl radical of $C_2$ to $C_4$; a hydroxyethylcellulose is preferably used as the water-soluble cellulose ether with the silane, the temperatures can be varied within a range from $-30°$ C. to $+130°$ C., in particular from $+30°$ C. to $+120°$ C.; adequate reaction times are from 10 to 180 minutes. The process is, for example, performed so that a cellulose ether, which is still moist with solvent from its preparation process, is reacted (by whirling, mixing or adding dropwise) with the silane dissolved in an organic solvent. Thereupon a drying phase follows. A silane which carries, for example, an alkanoyloxy radical as radical $R^4$ (or also $R^2$ and/or $R^3$), usually can be reacted with the cellulose ether without difficulty, whereas in the case of silanes carrying an alkoxy radical, it is often advisable to add an acid (for example, acetic acid).

The products prepared employing the process of this invention and the process itself present the following advantages:

The modified cellulose ethers can be added to aqueous media within a wide pH range, for example, a pH of 1 or 13, without the formation of lumps occurring.

The retardation of initial swelling or dissolution of the modified cellulose ethers can be controlled via the added amount of silane, process conditions and the type of silane.

In the case of some of the modified cellulose ethers it is possible to predetermine exactly the time where viscosity starts to develop. For example, they can be added without lump formation and remain insoluble when the aqueous system has a neutral pH, but due to a simple measure applied during the process, such as an elevated temperature or a pH modification, they start to dissolve and viscosity develops. This can be of particular advantage in those fields of application where, in order to achieve good miscibility of many components (e.g., in the preparation of dispersions, such as dispersion paints), good dispersing properties, but not high viscosity, are initially required.

The required quantity of silanes amounts to less than 0.12 mole per mole of cellulose, i.e., the advantages can be achieved by adding small amounts of silanes.

The process of the invention can be carried out discontinuously, but it may also be performed as a separate partial stage in one of the known modern continuous processes.

In the examples which follow, parts by weight are related to parts by volume as the g to the $cm^3$. Measurement of the initial and complete dissolution times was performed in water of different pH values using automatic viscograph equipment. The term "initial dissolution time" is defined as the time in minutes which elapses after the beginning of measurement before 5% of the total viscosity is reached, and the term "complete dissolution time" is defined as the time in minutes which lapses before the maximum viscosity is reached. MS denotes the molar degree of substitution, i.e., the reacted molar quantity of etherifying agent (for example, ethylene oxide) per mole of cellulose; it may also exceed 3 (the maximum value of the DS).

EXAMPLE 1

3,150 parts by weight of a hydroxyethylcellulose moist with isopropanol and water (viscosity about 70,000 mPa·s, determined according to Hoeppler, at 20° C. in an 1.9% aqueous solution, MS 2.5) and having a solids content of 20% are mixed at room temperature in a kneader with a freshly prepared solution of 6.3 parts by weight of ethyl-triacetoxysilane (=0.012 mole of silane per mole of cellulose) in 200 parts by volume of a 100% isopropanol. After mixing for 30 minutes, the reaction mixture is removed from the kneader and dried for 50 minutes in a fluidization dryer at a temperature of 80° C. Finally, the dried modified HEC is milled and sieved to obtain particles having a size of less than 160 μm. The fine powder produced in this way can be dispersed in neutral water by stirring without lump formation, but it does not dissolve at this pH. The dependence of the viscosity properties on pH variations is shown in Table I. As can be seen from the initial dissolution times, the product can be dispersed by stirring in acid as well as in alkaline media.

TABLE I

| pH of aqueous medium | Dissolution Time | | | | |
|---|---|---|---|---|---|
| | 1 | 2 | 7 | 12 | 13 |
| Initial dissolution time (minutes) | 1.8 | 10.0 | insoluble | 3.8 | 2.8 |
| Complete dissolution time (minutes) | 9.0 | 36.6 | insoluble | 17.0 | 10.0 |

COMPARATIVE EXAMPLE C1

The same process as described in Example 1 is followed, but without performing the modification with silane. Lumps form when the dried and milled, unmodified product is stirred into an acid, neutral or alkaline aqueous medium; no dispersing stirring-in is possible, complete dissolution is achieved after several hours only.

COMPARATIVE EXAMPLE C2

A commercially available HEC, which is reversibly cross-linked with glyoxal and has an initial dissolution time of about 30 minutes in neutral water, is stirred into an aqueous medium having an alkaline pH, whereby immediate formation of lumps is observed. The complete dissolution takes several hours; no dispersing stirring-in is possible in an alkaline medium.

EXAMPLE 2

The same process as described in Example 1 is followed, but with a solution comprised of 0.63 part by weight of ethyl-triacetoxysilane (=0.0012 mole of silane per mole of cellulose) in 50 parts by volume of isopropanol. Drying is performed for 60 minutes. The dependence of the viscosity properties of pH variations is shown in Table II below.

TABLE II

| pH of aqueous medium | Dissolution Time | | | | |
|---|---|---|---|---|---|
| | 2 | 7 | 10 | 11 | 12 |
| Initial dissolution time (minutes) | 11.5 | insoluble | 16.0 | 3.2 | 2.0 |
| Complete dissolution time (minutes) | 20.0 | insoluble | 32.0 | 13.0 | 7.0 |

The water-insoluble product dissolves within a few minutes when the pH is adjusted to about 11 to 12, but it can nevertheless be dispersed while being stirred in at this pH, as can be seen from the initial dissolution time.

EXAMPLE 3

The same process as described in Example 1 is followed, but using 300 parts by weight of a HEC having a solids content of 30%, and a solution of 0.1 part by weight of methyl-tri(2-methoxy-ethoxy)-silane (=0.0011 mole of silane per mole of cellulose) and 1 part by weight of glacial acetic acid in 50 parts by volume of the isopropanol. The dependence of the viscosity properties of pH variations is shown in Table III below.

TABLE III

| pH of aqueous medium | Dissolution Time | | | | |
|---|---|---|---|---|---|
| | 2 | 7 | 10 | 11 | 12 |
| Initial dissolution time (minutes) | 2.5 | insoluble | 5.5 | 1.5 | 1.0 |
| Complete dissolution | 7.0 | insoluble | 17.0 | 11.0 | 7.0 |

TABLE III-continued

| pH of aqueous medium | Dissolution Time | | | | |
|---|---|---|---|---|---|
| | 2 | 7 | 10 | 11 | 12 |
| time (minutes) | | | | | |

EXAMPLE 4

The same process as described in Example 3 is followed, but using a solution of 0.05 part by weight of ethyltriacetoxysilane (=0.00065 mole of silane per mole of cellulose) in 50 parts by volume of the isopropanol. In neutral water, the product obtained has an initial dissolution time of 10 minutes and a complete dissolution time of 60 minutes.

EXAMPLE 5

The same process as described in Example 1 is followed, but using 100 parts by weight of a dry HEC (viscosity 50,000 mPa·s, MS 2.5) and a solution of 0.1 part by weight of methyl-tri(2-methoxy-ethoxy-)silane (=0.001 mole of silane per mole of cellulose) and 1 part by weight of glacial acetic acid in 50 parts by volume of the isopropanol. In neutral water, the product obtained has an initial dissolution time of 20 minutes and a complete dissolution time of 93 minutes.

EXAMPLE 6

The same process as described in Example 3 is followed, but using a solution of 0.1 part by weight of methyltrimethoxysilane (=0.0022 mole of silane per mole of cellulose) and 1 part by weight of glacial acetic acid in 50 parts by volume of the isopropanol. In neutral water, the product obtained has an initial dissolution time of 17 minutes and a complete dissolution time of 85 minutes.

EXAMPLE 7

The same process as described in Example 3 is followed, but using a solution of 0.1 part by weight of methyltriethoxysilane (=0.0017 mole of silane per mole of cellulose) in 50 parts by volume of th isopropanol. In neutral water, the product obtained has an initial dissolution time of 1.5 minutes and a complete dissolution time of 10 minutes.

EXAMPLE 8

The same process as described in Example 1 is followed, but using 100 g of a dry MHEC (viscosity 15,000 mPa·s, $DS_M$ 1.6 and $MS_{HE}$ 0.2) and a solution of 10 parts by weight of ethyl-triacetoxysilane (=0.082 mole of silane per mole of cellulose) in 50 parts by volume of isopropanol; drying is performed in a drying cabinet at 120° C. for 120 minutes. In neutral water, the product obtained does not dissolve, and it can be dispersed in an aqueous medium having a pH of up to 11.5 without the formation of lumps.

The invention and its advantages are readily understood from the preceding description. Various changes may be made in reaction products, reaction media, reactants and other process parameters without departing from the spirit and scope of the invention or sacrificing its material advantages. The previously described processes and products are merely illustrative of preferred embodiments of the invention.

What is claimed is:

1. A process for preparing a modified cellulose reaction product, which is dispersible in aqueous media over a broad pH range without lump formation, by reacting water-soluble cellulose ether with a modifying agent in the amount of from 0.0001 to 0.12 mole of modifying agent per mole of cellulose in the cellulose ether;

the modifying agent being a silane, R—R⁴, in which R is of the formula

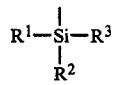

and wherein
R¹ is alkyl having from 1 to 4 carbon atoms, alkenyl having from 1 to 4 carbon atoms or carbocyclic aryl having one or two 6-membered rings and up to 15 carbon atoms (including aliphatic side groups) and optionally being ring substituted by a member selected from the group consisting of chloro, bromo, alkoxy having from 1 to 4 carbon atoms, carbocyclic aryloxy having one or two 6-membered rings and up to 15 carbon atoms (including aliphatic side groups) and phenyl;

R² is —H, one of the meanings of R¹ or one of the meanings of R⁴;

R³ is one of the meanings of R²; and

R⁴ is alkoxy having from 1 to 4 carbon atoms and optionally being substituted by a member selected from the group consisting of alkoxy having from 1 to 4 carbon atoms and carbocyclic aryloxy having one or two 6-membered rings and up to 15 carbon atoms (including aliphatic side groups); aryloxy having one or two 6-membered rings and up to 15 carbon atoms (including aliphatic side groups) and optionally being substituted by a member selected from the group consisting of alkoxy having from 1 to 4 carbon atoms and aryloxy having one or two 6-membered rings and up to 15 carbon atoms (including aliphatic side groups); aliphatic carboxylic acid acyloxy having up to 5 carbon atoms, aromatic carboxylic acid acyloxy having one or two 6-membered carbocyclic rings and up to 16 carbon atoms; O—R; or NH—R.

2. A process as claimed in claim 1, wherein R¹ denotes alkyl and R³ is the same as R⁴ and denotes optionally-substituted alkoxy or alkanoyloxy.

3. A process as claimed in claim 2, wherein R¹ denotes alkyl and R² is the same as R³ and R⁴ and denotes alkanoyloxy or alkoxy optionally being substituted with alkoxy, all alkyl groups having 1 or 2 carbon atoms.

4. A process as claimed in claim 1, which comprises reacting from 0.0005 to 0.1 mole of the modifying agent per mole of cellulose in the cellulose ether.

5. A process as claimed in claim 2, which comprises reacting from 0.0005 to 0.1 mole of the modifying agent per mole of cellulose in the cellulose ether.

6. A process as claimed in claim 3, which comprises reacting from 0.0005 to 0.1 mole of the modifying agent per mole of cellulose in the cellulose ether.

7. A process as claimed in claim 1, which comprises reacting the cellulose ether with the modifying agent and in contact with water-soluble organic solvent and water.

8. A process as claimed in claim 2, which comprises reacting the cellulose ether with the modifying agent and in contact with water-soluble organic solvent and water.

9. A process as claimed in claim 3, which comprises reacting the cellulose ether with the modifying agent and in contact with water-soluble organic solvent and water.

10. A process as claimed in claim 4, which comprises reacting the cellulose ether with the modifying agent and in contact with water-soluble organic solvent and water.

11. A process as claimed in claim 5, which comprises reacting the cellulose ether with the modifying agent and in contact with water-soluble organic solvent and water.

12. A process as claimed in claim 6, which comprises reacting the cellulose ether with the modifying agent and in contact with water-soluble organic solvent and water.

13. A process as claimed in claim 1, wherein the water-soluble cellulose ether is a hydroxyalkylcellulose or an alkyl-hydroxyalkylcellulose, the alkyl radical having 1 or 2 carbon atoms and the hydroxyalkyl radical from 2 to 4 carbon atoms.

14. A process as claimed in claim 2, wherein the water-soluble cellulose ether is a hydroxyalkylcellulose or an alkyl-hydroxyalkylcellulose, the alkyl radical having 1 or 2 carbon atoms and the hydroxyalkyl radical having from 2 to 4 carbon atoms.

15. A process as claimed in claim 3, wherein the water-soluble cellulose ether is a hydroxyalkylcellulose or an alkyl-hydroxyalkylcellulose, the alkyl radical having 1 or 2 carbon atoms and the hydroxyalkyl radical having from 2 to 4 carbon atoms.

16. A process as claimed in claim 4, wherein the water-soluble cellulose ether is a hydroxyalkylcellulose or an alkyl-hydroxyalkylcellulose, the alkyl radical having 1 or 2 carbon atoms and the hydroxyalkyl radical having from 2 to 4 carbon atoms.

17. A process as claimed in claim 7, wherein the water-soluble cellulose ether is a hydroxyalkylcellulose or an alkyl-hydroxyalkylcellulose, the alkyl radical having 1 or 2 carbon atoms and the hydroxyalkyl radical having from 2 to 4 carbon atoms.

18. A process as claimed in claim 1, wherein the water-soluble cellulose ether is a hydroxyethylcellulose.

19. A process as claimed in claim 2, wherein the water-soluble cellulose ether is a hydroxyethylcellulose.

20. A process as claimed in claim 3, wherein the water-soluble cellulose ether is a hydroxyethylcellulose.

21. A process as claimed in claim 4, wherein the water-soluble cellulose ether is a hydroxyethylcellulose.

22. A process as claimed in claim 7, wherein the water-soluble cellulose ether is a hydroxyethylcellulose.

23. A process as claimed in claim 13, wherein the water-soluble cellulose ether is a hydroxyethylcellulose.

24. A process for rendering water-soluble cellulose ether dispersible in aqueous media over a broad pH range without lump formation which consists essentially of reacting with the cellulose ether from 0.0001 to 0.12 mole of silane (R⁴—R) per mole of cellulose; R, in the silane structure, being of the formula:

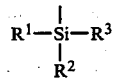

wherein
R$^1$ is alkyl having from 1 to 4 carbon atoms, alkenyl having from 1 to 4 carbon atoms or carbocyclic aryl having one or two 6-membered rings and up to 15 carbon atoms (including aliphatic side groups) and optionally being ring substituted by a member selected from the group consisting of chloro, bromo, alkoxy having from 1 to 4 carbon atoms, carbocyclic aryloxy having one or two 6-membered rings and up to 15 carbon atoms (including aliphatic side groups) and phenyl;

R$^2$ is —H, one of the meanings of R$^1$ or one of the meanings of R$^4$;

R$^3$ is one of the meanings of R$^2$; and

R$^4$ is alkoxy having from 1 to 4 carbon atoms and optionally being substituted by a member selected from the group consisting of alkoxy having from 1 to 4 carbon atoms and carbocyclic aryloxy having one or two 6-membered rings and up to 15 carbon atoms (including aliphatic side groups); aryloxy having one or two 6-membered rings and up to 15 carbon atoms (including aliphatic side groups) and optionally being substituted by a member selected from the group consisting of alkoxy having from 1 to 4 carbon atoms and aryloxy having one or two 6-membered rings and up to 15 carbon atoms (including aliphatic side groups); aliphatic carboxylic acid acyloxy having up to 5 carbon atoms; aromatic carboxylic acid acyloxy having one or two 6-membered carbocyclic rings and up to 16 carbon atoms; O—R; or NH—R.

25. A (cellulose ether)/silane reaction product which is dispersible in aqueous media over a broad pH range without lump formation, which is based upon from 0.0001 to 0.12 mole of silane per mole of cellulose and wherein:

(a) the cellulose ether is water-soluble cellulose ether and (b) the silane is R$^4$—R, R being of the formula:

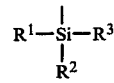

wherein
R$^1$ is alkyl having from 1 to 4 carbon atoms, alkenyl having from 1 to 4 carbon atoms or carbocyclic aryl and one or two 6-membered rings, having up to 15 carbon atoms (including aliphatic side groups) and optionally being ring substituted by a member selected from the group consisting of chloro, bromo, alkoxy having from 1 to 4 carbon atoms, carbocyclic aryloxy having one or two 6-membered rings and up to 15 carbon atoms (including aliphatic side groups) and phenyl;

R$^2$ is —H, one of the meanings of R$^1$ or one of the meanings of R$^4$;

R$^3$ is one of the meanings of R$^2$; and

R$^4$ is alkoxy having from 1 to 4 carbon atoms and optionally being substituted by a member selected from the group consisting of alkoxy having from 1 to 4 carbon atoms and carbocyclic aryloxy having one or two 6-membered rings and up to 15 carbon atoms (including aliphatic side groups); aryloxy having one or two 6-membered rings and up to 15 carbon atoms (including aliphatic side groups) and optionally being substituted by a member selected from the group consisting of alkoxy having from 1 to 4 carbon atoms and aryloxy having one or two 6-membered rings and up to 15 carbon atoms (including aliphatic side groups); aliphatic carboxylic acid acyloxy having up to 5 carbon atoms; aromatic carboxylic acid acyloxy having one or two 6-membered carbocyclic rings and up to 16 carbon atoms; O—R; or NH—R.

* * * * *